United States Patent
Wedge

(10) Patent No.: US 9,524,448 B2
(45) Date of Patent: Dec. 20, 2016

(54) LOCATION-BASED SIGNATURE SELECTION FOR MULTI-CAMERA OBJECT TRACKING

(71) Applicant: CANON KABUSHIKI KAISHA, Tokyo (JP)

(72) Inventor: Daniel John Wedge, Dianella (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 41 days.

(21) Appl. No.: 14/078,292

(22) Filed: Nov. 12, 2013

(65) Prior Publication Data

US 2014/0072174 A1 Mar. 13, 2014

Related U.S. Application Data

(62) Division of application No. 12/959,032, filed on Dec. 2, 2010, now Pat. No. 8,615,106.

(30) Foreign Application Priority Data

Dec. 4, 2009 (AU) ............................. 2009-243528

(51) Int. Cl.
  *G06K 9/00* (2006.01)
  *G06K 9/62* (2006.01)
  (Continued)

(52) U.S. Cl.
  CPC ........... *G06K 9/6202* (2013.01); *G06T 7/2093* (2013.01); *G06K 2009/3291* (2013.01); *G06T 2207/30232* (2013.01)

(58) Field of Classification Search
  None
  See application file for complete search history.

(56) References Cited

U.S. PATENT DOCUMENTS 6,590,999 B1  7/2003  Comaniciu et al.
7,035,431 B2  4/2006  Blake et al.
(Continued)

OTHER PUBLICATIONS

Office Action dated Jan. 31, 2012 in Australian Application No. 2009-243528.

*Primary Examiner* — Chan Park
*Assistant Examiner* — Iman K Kholdebarin
(74) *Attorney, Agent, or Firm* — Fitzpatrick, Cella, Harper & Scinto

(57) ABSTRACT

Disclosed herein are a method, system, and computer program product for determining a correspondence between a first object (713) tracked in a first field of view and a second object tracked (753) in a second field of view. The method determines a first area (711) in the first field of view, based on the location and size of the first object (713). The method utilizes a predetermined area relationship between the first area (711) in the first field of view and at least one area (751) in the second field of view to determine a second area (751) in the second field of view. In one embodiment, the method determines the second area (751) in the second field of view by comparing predetermined area relationships between the first area (711) and any areas (751) in the second field to determine a best match. The method determines a correspondence between the first object (713) and the second object (753), based on a comparison between a first object signature associated with the first object (713) and a second object signature associated with the second object (753).

15 Claims, 10 Drawing Sheets

(51) Int. Cl.
*G06T 7/20* (2006.01)
*G06K 9/32* (2006.01)

(56) References Cited

U.S. PATENT DOCUMENTS

| | | | |
|---|---|---|---|
| 7,242,423 B2 | 7/2007 | Lin | |
| 7,450,735 B1* | 11/2008 | Shah | G06T 7/2093 |
| | | | 348/143 |
| 7,623,676 B2* | 11/2009 | Zhao | G06K 9/00369 |
| | | | 348/580 |
| 7,676,064 B2 | 3/2010 | Neff et al. | |
| 8,130,285 B2 | 3/2012 | Haupt et al. | |
| 8,218,011 B2 | 7/2012 | Cheng et al. | |
| 8,224,029 B2 | 7/2012 | Saptharishi et al. | |
| 8,254,633 B1* | 8/2012 | Moon | G06K 9/00771 |
| | | | 382/103 |
| 8,358,805 B2* | 1/2013 | Ma | G06K 9/00677 |
| | | | 340/573.1 |
| 8,532,390 B2* | 9/2013 | Brown | G06K 9/00369 |
| | | | 382/190 |
| 8,575,527 B2* | 11/2013 | Fry | F41G 7/2253 |
| | | | 244/3.1 |
| 8,599,266 B2* | 12/2013 | Trivedi | G06K 9/00234 |
| | | | 348/143 |
| 8,803,975 B2* | 8/2014 | Haupt | G06K 9/00288 |
| | | | 348/161 |
| 2001/0046309 A1 | 11/2001 | Kamei | |
| 2003/0108220 A1 | 6/2003 | Jepson et al. | |
| 2003/0128298 A1 | 7/2003 | Moon et al. | |
| 2004/0156530 A1 | 8/2004 | Brodsky et al. | |
| 2004/0252194 A1* | 12/2004 | Lin | H04N 7/181 |
| | | | 348/169 |
| 2005/0264655 A1* | 12/2005 | He | H04N 5/23203 |
| | | | 348/211.99 |
| 2006/0028552 A1* | 2/2006 | Aggarwal | G01S 3/7864 |
| | | | 348/169 |
| 2006/0140450 A1 | 6/2006 | Hong et al. | |
| 2006/0222209 A1* | 10/2006 | Zhang | G06K 9/00771 |
| | | | 382/107 |
| 2006/0285723 A1 | 12/2006 | Morellas et al. | |
| 2007/0237359 A1 | 10/2007 | Sun | |
| 2008/0181453 A1 | 7/2008 | Xu et al. | |
| 2009/0245573 A1 | 10/2009 | Saptharishi et al. | |
| 2011/0135154 A1 | 6/2011 | Wedge | |

* cited by examiner

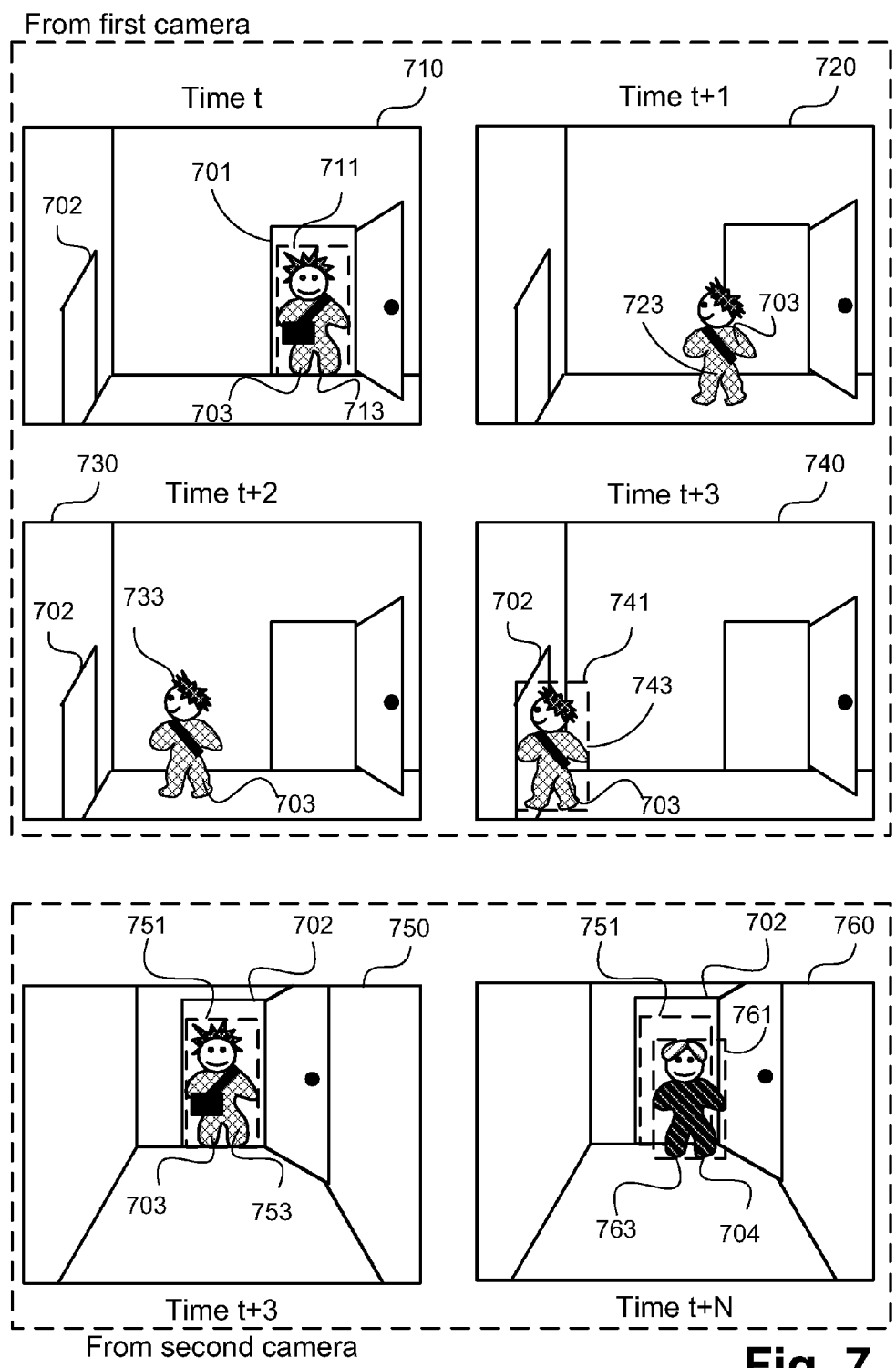

LOCATION-BASED SIGNATURE SELECTION FOR MULTI-CAMERA OBJECT TRACKING

This application is a divisional of application Ser. No. 12/959,032, filed Dec. 2, 2010 (allowed), the contents of which are incorporated by reference herein.

RELATED APPLICATION

This application claims the right of priority under 35 U.S.C. §119 based on Australian Patent Application No. 2009243528 entitled "Location-based signature selection for multi-camera object tracking", filed on 4 Dec. 2009 in the name of Canon Kabushiki Kaisha, the entire contents of which are incorporated herein by reference as if fully set forth herein.

TECHNICAL FIELD

The present disclosure relates to object tracking and, in particular, to using multiple cameras to track objects which have varying appearances.

BACKGROUND

Many existing approaches for tracking an object throughout multiple video sequences recorded by different cameras operate by matching spatial, temporal, and appearance characteristics of the object. Spatial characteristics may include the position of is an object and the size of an object. Temporal characteristics may include the time elapsed between an object leaving a field of view of one camera and the object appearing in a field of view of another camera. Appearance characteristics may include a summary of the luminance or chrominance values of image elements comprising the object. Such a summary may be presented, for example, as a histogram. A summary of an appearance of an object is known as a signature.

One approach for tracking an object using multiple cameras performs tracking independently for a field of view associated with each respective camera. Then, corresponding tracks from each camera representing the same real-world object are determined based on spatio-temporal correspondences. In one method, a spatio-temporal correspondence is maintained between a first location where an object exits the field of view of a first camera and a second location where the object enters the field of view of a second camera after some transit time. Pairs of tracks satisfying this spatio-temporal constraint are considered to correspond to the same real-world object. In multiple-camera-tracking, if the spatio-temporal constraint is satisfied, a pair of tracks with matching signatures can be used to confirm that the tracks match. Otherwise, a new spatio-temporal constraint can be proposed if the signature match is sufficiently strong.

In the last-seen signature method, corresponding tracks are determined based on the last-seen signature of an object. Thus, only a single signature is required to store the representation of a given track. However, the last-seen signature method cannot compensate for differences in pose due to the position of the camera relative to the orientation of the tracked object. Consider an example where the principal axes of a first and a second camera are orthogonal to each other and a person leaves the field of view of the first camera and later enters the field of view of the second camera. As the person exits the field of view of the first camera, the last-seen signature of the track may represent a profile view of the person, but as the person enters the field of view of the second camera, a frontal view of the person is seen, producing a different signature. This can lead to errors in determining corresponding tracks and is, therefore, a disadvantage of using the last-seen signature method.

An alternative approach for determining corresponding tracks is the exemplar method. The exemplar method associates a predetermined set of signature exemplars with each track. Ideally, each exemplar represents a different appearance of the object. For example, one exemplar may show a frontal view and another exemplar may show a side view. Exemplars may be determined by performing clustering of previously-seen signatures of an object. For example, one exemplar may represent a frontal view of a person, whilst another exemplar may represent one or more profile views of a person, and yet another exemplar may represent the rear view of a person. A disadvantage of the exemplar method is that the number of exemplars may have a fixed upper bound and therefore the correct choice of the number of exemplars is critical to determining a representative set of appearances. For example, incorrectly selecting the number of exemplars may lead to two distinct clusters of appearances being represented by one exemplar which is not actually representative of either cluster. When matching a given signature with a set of exemplars, the given signature is compared to each exemplar in turn. This can be computationally expensive and is another disadvantage of the exemplar method.

Thus, a need exists to provide an improved system and method for multi-camera object tracking.

SUMMARY

It is an object of the present invention to overcome substantially, or at least ameliorate, one or more disadvantages of existing arrangements.

According to a first aspect of the present disclosure, there is provided a method of determining a correspondence between a first object tracked in a first field of view and a second object tracked in a second field of view. The method determines a first area in the first field of view, based on at least one characteristic of the first object. In one embodiment, the at least one characteristic of the first object may include a spatial characteristic, temporal characteristic, appearance characteristic, or any combination thereof. In one embodiment, the first area corresponds to a bounding box of the first object. The method determines a second area in the second field of view, by utilising a predetermined area relationship between the first area in the first field of view and an area in the second field of view associated with the second object. There may be one or more predetermined area relationships between the first area in the first field of view and one or more areas in the second field of view. In one embodiment, the method determines the second area in the second field of view by comparing the predetermined area relationships between the first area and any areas in the second field to determine a best match.

The method derives from the first area a first object signature associated with the first object and derives from the second area a second object signature associated with the second object. The method then determines a correspondence between the first object and the second object, based on a comparison of the first object signature and the second object signature.

According to a second aspect of the present disclosure, there is provided a method of determining an area relationship between a first area in a first field of view and a second area in a second field of view. The method selects a first track associated with the first field of view and a second track associated with the second field of view. The method then selects a first signature associated with the first track and selects from a set of signatures associated with the second track a second signature most similar in appearance to the first appearance.

The method then computes an appearance similarity between the first signature and the second signature, determines a first area in the first field of view, based on a registered area and determines a second area in the second field of view, based on the registered area. The method then determines the area relationship between the first area and the second area, based on the appearance similarity.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the aforementioned methods.

Other aspects of the invention are also disclosed.

BRIEF DESCRIPTION OF THE DRAWINGS

One or more embodiments of the invention will now be described with reference to the following drawings, in which:

FIG. 7 is a diagram illustrating multiple cameras viewing various poses of a person walking through a scene;

DETAILED DESCRIPTION

Figure 1:
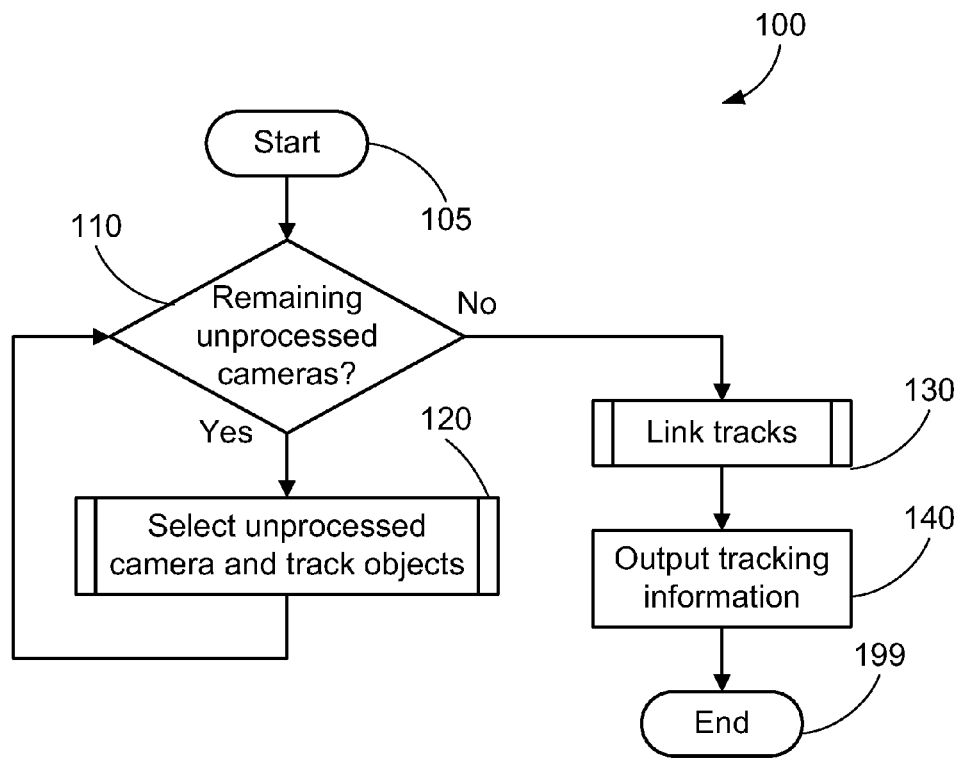
FIG. 1 is a schematic flow diagram illustrating a method of tracking across multiple cameras using location-based signature selection.

Where reference is made in any one or more of the accompanying drawings to steps and/or features that have the same reference numerals, those steps and/or features have for the purposes of this description the same function(s) or operation(s), unless the contrary intention appears.

A video is a sequence of images or frames. Thus, each frame is an image in an image sequence. Each frame of the video has an x axis and a y axis. A scene is the information contained in a frame and may include, for example, foreground objects, background objects, or a combination thereof. A scene model is stored information relating to a background. A scene model generally relates to background information derived from an image sequence. A video may be encoded and compressed. Such encoding and compression may be performed intra-frame, such as motion-JPEG (M-JPEG), or inter-frame, such as specified in the H.264 standard.

An image is made up of visual elements. The visual elements may be, for example, pixels, or 8×8 DCT (Discrete Cosine Transform) blocks as used in JPEG images in a motion-JPEG stream, or wavelet transforms.

The present disclosure provides a method, system, and computer program product for determining a correspondence between a first object tracked in a first field of view and a second object tracked in a second field of view. The correspondence between the first object and the second object provides a measure of how likely it is that the first object and the second object are, in fact, the same real-world object.

The present disclosure provides a method of determining a correspondence between a first object tracked in a first field of view and a second object tracked in a second field of view. The method determines a first area in the first field of view, based on at least one characteristic of the first object. The at least one characteristic may include, for example, a spatial characteristic, temporal characteristic, appearance characteristic, or any combination thereof. In one example, the at least characteristic of the first object includes the size and location of the first object. In one embodiment, the first area corresponds to a bounding box of the first object. The method determines a second area in the second field of view, by utilising a predetermined area relationship between the first area in the first field of view and an area in the second field of view associated with the second object. There may be one or more predetermined area relationships between the first area in the first field of view and one or more areas in the second field of view. In one embodiment, the method determines the second area in the second field of view by comparing the predetermined area relationships between the first area and any areas in the second field to determine a best match. In one embodiment, the determining of the second area is based on at least one characteristic of the second object.

The method derives from the first area a first object signature associated with the first object and derives from the second area a second object signature associated with the second object. The method then determines a correspondence between the first object and the second object, based on a comparison of the first object signature and the second object signature.

The present disclosure also provides a method of determining an area relationship between a first area in a first field of view and a second area in a second field of view. The method selects a first track associated with the first field of view and a second track associated with the second field of view. The method then selects a first signature associated with the first track and selects from a set of signatures associated with the second track a second signature most similar in appearance to the first appearance.

The method then computes an appearance similarity between the first signature and the second signature, determines a first area in the first field of view from which the first signature was derived, based on a registered area, and determines a second area in the second field of view from which the second appearance was derived, based on the registered area. The method then determines the area relationship between the first area and the second area, based on the appearance similarity.

Figure 8A:
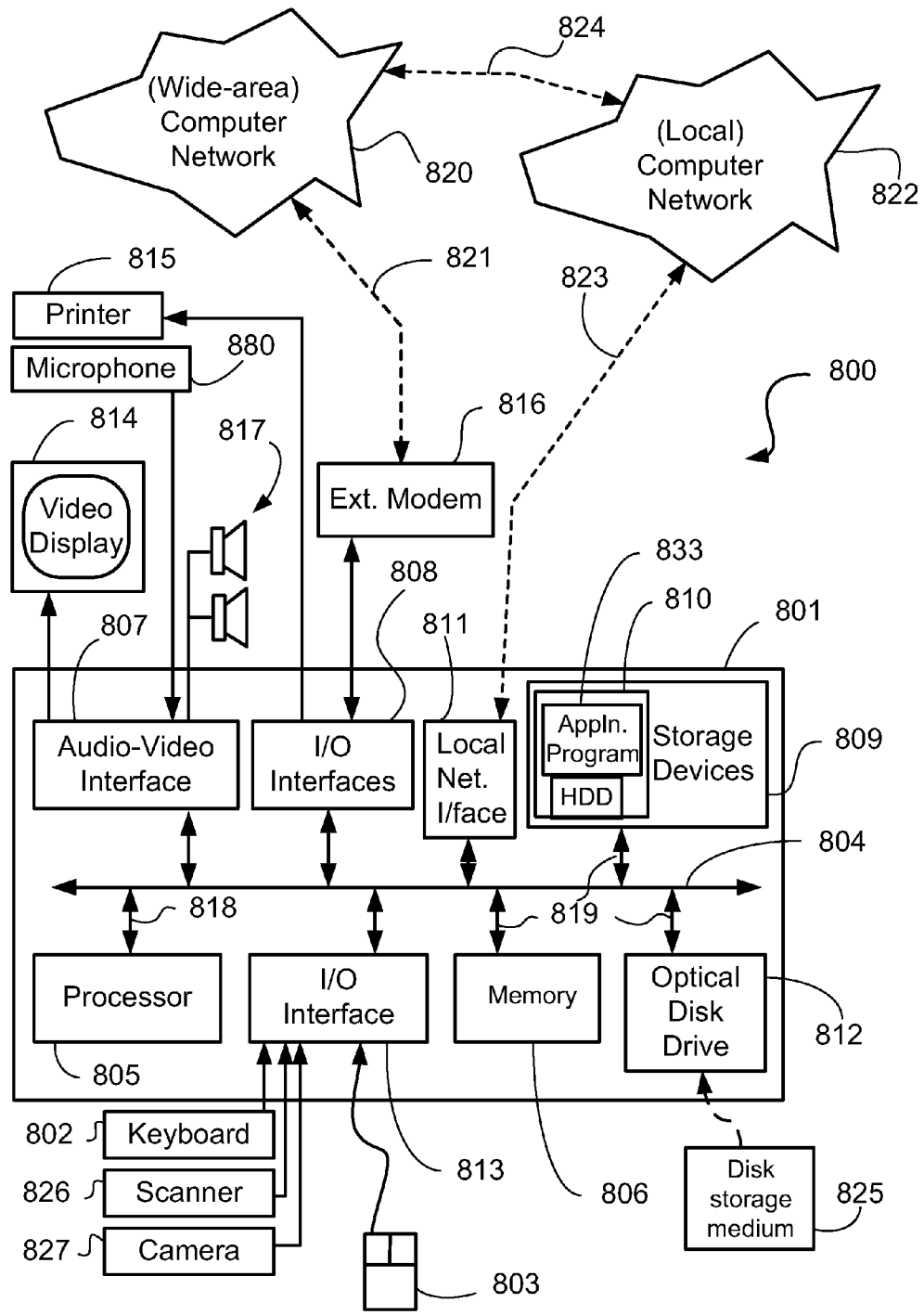
FIGS. 8A and 8B collectively form a schematic block diagram of a general purpose computing system in which the arrangements to be described may be implemented.
Figure 8B:
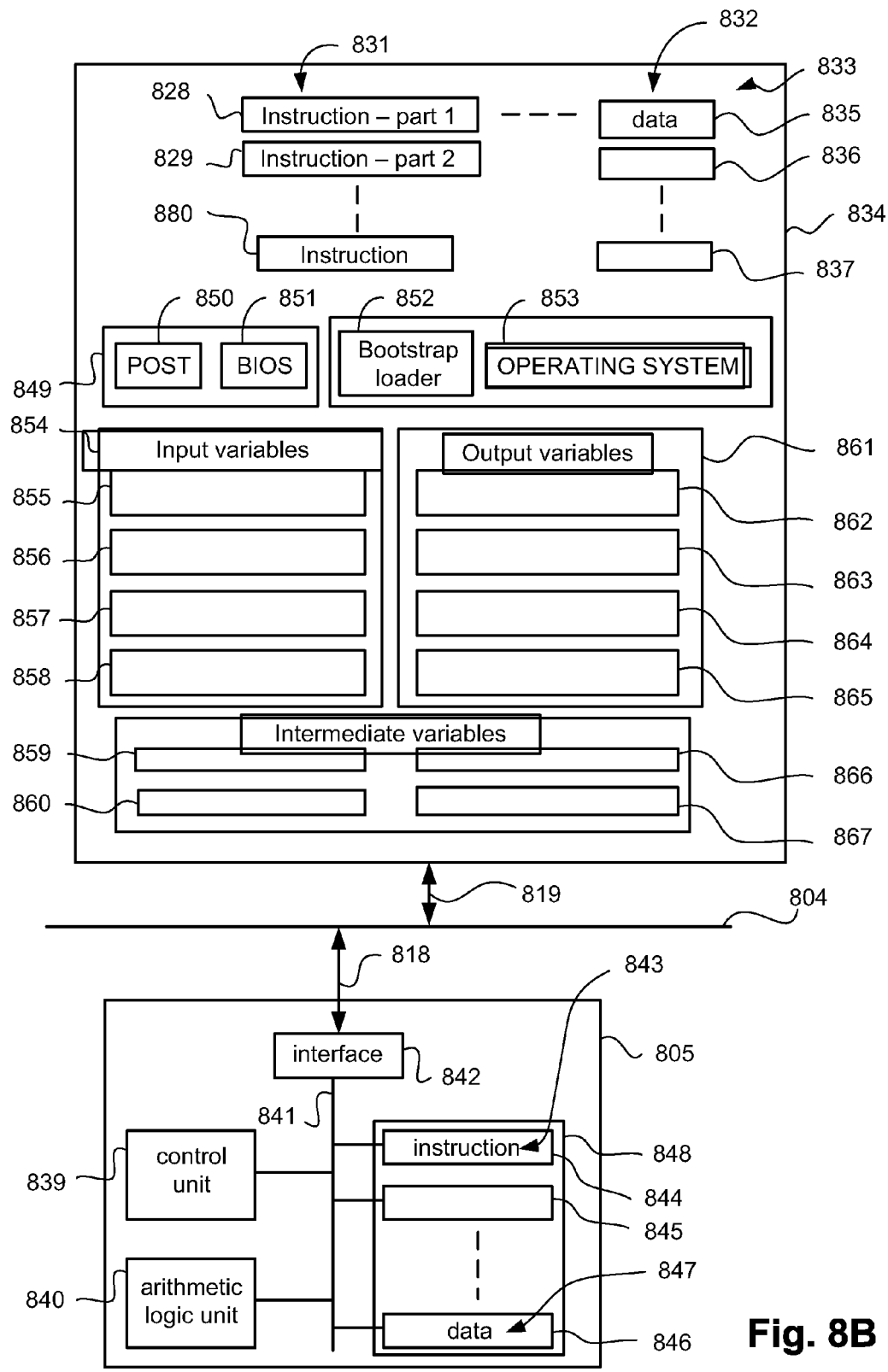

FIGS. 8A and 8B collectively form a schematic block diagram of a general purpose computer system 800, upon which the various arrangements described can be practised.

As seen in FIG. 8A, the computer system 800 is formed by a computer module 801, input devices such as a keyboard 802, a mouse pointer device 803, a scanner 826, a camera 827, and a microphone 880, and output devices including a printer 815, a display device 814 and loudspeakers 817. An external Modulator-Demodulator (Modem) transceiver device 816 may be used by the computer module 801 for communicating to and from a communications network 820 via a connection 821. The network 820 may be a wide-area network (WAN), such as the Internet, or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the network 820.

The computer module 801 typically includes at least one processor unit 805, and a memory unit 806 for example formed from semiconductor random access memory (RAM) and semiconductor read only memory (ROM). The module 801 also includes a number of input/output (I/O) interfaces including an audio-video interface 807 that couples to the video display 814, loudspeakers 817 and microphone 880, an I/O interface 813 for the keyboard 802, mouse 803, scanner 826, camera 827 and optionally a joystick (not illustrated), and an interface 808 for the external modem 816 and printer 815. In some implementations, the modem 816 may be incorporated within the computer module 801, for example within the interface 808. The computer module 801 also has a local network interface 811 which, via a connection 823, permits coupling of the computer system 800 to a local computer network 822, known as a Local Area Network (LAN). As also illustrated, the local network 822 may also couple to the network 820 via a connection 824, which would typically include a so-called "firewall" device or device of similar functionality. The interface 811 may be formed by an Ethernet™ circuit card, a Bluetooth™ wireless arrangement or an IEEE 802.11 wireless arrangement.

The interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive (not illustrated) may also be used. An optical disk drive 812 is typically provided to act as a non-volatile source of data. Portable memory devices, such optical disks (e.g., CD-ROM, DVD), USB-RAM, and floppy disks, for example, may then be used as appropriate sources of data to the system 800.

The components 805 to 813 of the computer module 801 typically communicate via an interconnected bus 804 and in a manner which results in a conventional mode of operation of the computer system 800 known to those in the relevant art. The storage devices 809, memory 806 and optical disk drive 812 are connected to other components of the computer system 800 via the connection 819. Examples of computers on which the described arrangements can be practised include IBM-PCs and compatibles, Sun Sparcstations, Apple Mac™, or alike computer systems evolved therefrom.

The method of tracking across multiple cameras using location-based signature selection may be implemented using the computer system 800 wherein the processes of FIGS. 1 to 6 may be implemented as one or more software application programs 833 executable within the computer system 800. In particular, the steps of the method of tracking across multiple cameras using location-based signature selection are executed by instructions 831 in the software 833 that are carried out within the computer system 800. The software instructions 831 may be formed as one or more code modules, each for performing one or more particular tasks. The software may also be divided into two separate parts, in which a first part and the corresponding code modules perform the method for determining a correspondence between a source object in a first video frame and a target object in a second video frame, and a second part and the corresponding code modules manage a user interface between the first part and the user.

The software 833 is generally loaded into the computer system 800 from a computer readable medium, and is then typically stored in the HDD 810, as illustrated in FIG. 8A, or the memory 806, after which the software 833 can be executed by the computer system 800. In some instances, the application programs 833 may be supplied to the user encoded on one or more CD-ROMs 825 and read via the corresponding drive 812 prior to storage in the memory 810 or 806. Alternatively, the software 833 may be read by the computer system 800 from the networks 820 or 822 or loaded into the computer system 800 from other computer readable media. Computer readable storage media refers to any storage medium that participates in providing instructions and/or data to the computer system 800 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 801. Examples of computer readable transmission media that may also participate in the provision of software, application programs, instructions and/or data to the computer module 801 include radio or infra-red transmission channels, as well as a network connection to another computer or networked device, and the Internet or Intranets including e-mail transmissions and information recorded on Websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory devices (including the HDD 810 and semiconductor memory 806) that can be accessed by the computer module 801 in FIG. 8A. In one implementation, the processor 805 and memory 834 form part of a camera system for capturing a first video frame and a second video frame and then determining a correspondence between a source object in the first video frame and a target object in the second video frame.

When the computer module 801 is initially powered up, a power-on self-test (POST) program 850 executes. The POST program 850 is typically stored in a ROM 849 of the semiconductor memory 806. A program permanently stored in a hardware device such as the ROM 849 is sometimes referred to as firmware. The POST program 850 examines hardware within the computer module 801 to ensure proper functioning, and typically checks the processor 805, the memory (809, 806), and a basic input-output systems software (BIOS) module 851, also typically stored in the ROM 849, for correct operation. Once the POST program 850 has run successfully, the BIOS 851 activates the hard disk drive 810. Activation of the hard disk drive 810 causes a bootstrap loader program 852 that is resident on the hard disk drive 810 to execute via the processor 805. This loads an operating system 853 into the RAM memory 806 upon which the operating system 853 commences operation. The operating system 853 is a system level application, executable by the processor 805, to fulfil various high level functions, including processor management, memory management, device management, storage management, software application interface, and generic user interface.

The operating system 853 manages the memory (809, 806) in order to ensure that each process or application running on the computer module 801 has sufficient memory in which to execute without colliding with memory allocated to another process. Furthermore, the different types of memory available in the system 800 must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used.

The processor 805 includes a number of functional modules including a control unit 839, an arithmetic logic unit (ALU) 840, and a local or internal memory 848, sometimes called a cache memory. The cache memory 848 typically includes a number of storage registers 844-846 in a register section. One or more internal buses 841 functionally interconnect these functional modules. The processor 805 typically also has one or more interfaces 842 for communicating with external devices via the system bus 804, using a connection 818.

The application program 833 includes a sequence of instructions 831 that may include conditional branch and loop instructions. The program 833 may also include data 832 which is used in execution of the program 833. The instructions 831 and the data 832 are stored in memory locations 828-830 and 835-837 respectively. Depending upon the relative size of the instructions 331 and the memory locations 828-830, a particular instruction may be stored in a single memory location as depicted by the instruction shown in the memory location 830. Alternatively, an instruction may be segmented into a number of parts each of which is stored in a separate memory location, as depicted by the instruction segments shown in the memory locations 828-829.

In general, the processor 805 is given a set of instructions which are executed therein. The processor 805 then waits for a subsequent input, to which it reacts to by executing another set of instructions. Each input may be provided from one or more of a number of sources, including data generated by one or more of the input devices 802, 803, data received from an external source across one of the networks 820, 822, data retrieved from one of the storage devices 806, 809 or data retrieved from a storage medium 825 inserted into the corresponding reader 812. In one implementation, the input is provided by one or more camera sensors, each of which is associated with a corresponding lens system. In one embodiment, the lens system is external to the camera sensor. In an alternative embodiment, the lens system is integral to the camera system. The execution of a set of the instructions may in some cases result in output of data. Execution may also involve storing data or variables to the memory 834.

The video object fragmentation detection arrangements disclosed herein use input variables 854, that are stored in the memory 834 in corresponding memory locations 855-858. The video object fragmentation detection arrangements produce output variables 861, that are stored in the memory 834 in corresponding memory locations 862-865. Intermediate variables may be stored in memory locations 859, 860, 866 and 867.

The register section 844-846, the arithmetic logic unit (ALU) 840, and the control unit 839 of the processor 805 work together to perform sequences of micro-operations needed to perform "fetch, decode, and execute" cycles for every instruction in the instruction set making up the program 833. Each fetch, decode, and execute cycle comprises:

(a) a fetch operation, which fetches or reads an instruction 831 from a memory location 828;

(b) a decode operation in which the control unit 839 determines which instruction has been fetched; and (c) an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Each step or sub-process in the processes of FIGS. 1 to 6 is associated with one or more segments of the program 833, and is performed by the register section 844-847, the ALU 840, and the control unit 839 in the processor 805 working together to perform the fetch, decode, and execute cycles for every instruction in the instruction set for the noted segments of the program 833.

The method of tracking across multiple cameras using location-based signature selection may alternatively be implemented in dedicated hardware such as one or more integrated circuits performing the functions or sub functions of creating association hypotheses in tracking, data association for tracking, associating detections with tracks and determining if a track represents the same real-world object. Such dedicated hardware may include graphic processors, digital signal processors, or one or more microprocessors and associated memories, or a camera incorporating one or more of these components.

In one arrangement for the detection of real-world objects visible in a video, a foreground separation method is applied to the frames of the video, resulting in detections. In one arrangement, foreground separation is done by frame differencing, in which a current frame is subtracted from the previous frame. In another arrangement, foreground separation is performed by background modelling. That is, a scene model is created by aggregating the visual characteristics of pixels or blocks in the scene over time. Visual characteristics that have contributed consistently to the model are considered to be background. The area where the background model is different from the current frame is then considered to be foreground.

A detection has spatial characteristics containing at least a height, a width, and a position (both x and y). There may be more characteristics associated with a detection, such as, for example, a roundness measure or a principal axis. The characteristics may be based on a silhouette of the object, or on the original visual content corresponding to the object. In one arrangement, the position of the detection is the top-left corner of a bounding box (with width and height) of the detection. In another arrangement, the position of the detection is the centroid of the detection, the width of the detection is the difference between the greatest and smallest x-coordinate that is part of the detection, and the height is computed in a similar fashion along the y-axis.

A detection also has a visual representation, otherwise known as a signature, which is a summary of the appearance of the detection. In one arrangement, the signature is a histogram of colour components, such as, for example, hue. Thus, the signature represents the distribution of colour in the area of the frame occupied by the detected object. In another arrangement, the signature is a histogram of luminance values. Thus, the signature represents the distribution of luminance in the area of the frame occupied by the detected object. In yet another arrangement, the signature is a histogram of luminance values and a histogram of colour components. Thus, the signature represents both the distribution of colour and the distribution of luminance in the area of the frame occupied by the detected object. In one arrangement, each histogram is computed from foreground image elements as determined by a foreground separation method. In one arrangement, the bounding boxes of the foreground image elements are equally subdivided into a grid according to a predetermined grid resolution and histograms are independently computed for each grid area. Thus, changes in the appearance of one area of the object do not affect the histogram representing a different area of the object.

In one arrangement, to compute the visual difference between two signatures, the histograms representing each signature are considered as vectors. The visual difference is then the Euclidean distance between the vectors. That is, given two histograms, each with n bins, if corresponding bins from each histogram are denoted $p_i$ and $q_i$ the visual difference is:

$$\text{visual\_difference} = \sqrt{\sum_{i=1}^{n} (p_i - q_i)^2} \quad (1)$$

In one arrangement, the vectors are firstly normalised to be unit vectors according to the Manhattan norm. As a result, the visual difference is then given by:

$$\text{visual\_difference} = \sqrt{\sum_{i=1}^{n} \left( \frac{p_i}{\sum_{j=1}^{n} p_j} - \frac{q_i}{\sum_{j=1}^{n} q_j} \right)^2} \quad (2)$$

The resulting visual difference returns values in the range from 0 to 2. A visual difference of 0 indicates that the signatures are identical.

In one embodiment, a track is an ordered sequence of identifiers of one real-world object, derived from multiple detections extracted from frames of the image sequence. In one arrangement, the identifier comprises a frame number and the identifiers of the detections in each frame comprise the track. In one arrangement, a track also maintains a track signature representing the appearance of the object being tracked. In one arrangement, the track signature is the signature of the first detection associated with the track. In another arrangement, in each frame, the track signature is the signature of the most recent detection associated with the track, and may be replaced as frames are added to the track over time. In yet another arrangement, the track signature is updated in each frame based on the signature extracted from that frame. For example, when the track is associated with a detection, each element of the track signature is replaced by the mean of the corresponding elements of the previous track signature and the signature of the detection.

In one arrangement, a track may utilise a multi-modal signature. A multi-modal signature is a set of multiple signature modes, with each signature mode representing one view of the tracked object. For example, one signature mode may correspond to a frontal view of an object and another signature mode may correspond to a profile view of an object. In one arrangement, a multi-modal signature can store a predetermined maximum number of signatures, say 5. In one arrangement, when associating a detection with the track, the signature mode with the lowest visual difference to the signature of the detection is used for association. In one arrangement, each element of the signature mode used for association is updated upon association by replacing the element with the mean of the corresponding elements of the signature of the detection and the previous value of the signature mode used for association.

In one embodiment, each signature mode is associated with a set of one or more statistics, for example for management of the modes, such as mode deletion. One statistic is the frame number of the frame in which the mode was created (the creation frame). Another statistic is the frame number of the frame in which the mode was most recently used in computing the visual difference with an associated object (the most recent association frame). Yet another statistic is the number of frames in which the mode has been used in computing the visual difference with an associated object, since the creation frame (the association count).

A tracker maintains a collection of tracks. In each frame, the tracker creates an expected spatial representation, which will be referred to as an expectation, for each track based on the previous attributes of the track. In one arrangement, the attributes of the expectation are the size, the velocity, and the position of the tracked object. Given an expectation for a track, and a set of detections in a frame, the tracker can compute a spatial difference for pairs of expectations and detections. The computation of the spatial difference is described in more detail later.

In one arrangement, predetermined variances must be provided in order to compute the spatial difference. The predetermined variances are computed prior to performing the tracking method by firstly generating detections from pre-recorded image sequences that together form a training set. Associations are manually formed between detections from consecutive frames of the training set. These associations are joined together temporally to form tracks. Then, for each track beginning from a third frame, an expectation is produced, for example, based on the velocity of the tracked object in the two previous frames. Each expectation is compared to the corresponding detection in the same frame of the training set to determine the difference of each component, such as, for example, the differences in horizontal location, vertical location, width and height. From these differences, statistical variances can be computed representing the error in each component. The statistical variance z is the horizontal difference between the centre of the detection and the centre of the expectation. In one arrangement, $\hat{x}$ is computed by first determining the difference between the horizontal location of the expectation and the horizontal location of the detection. This step is repeated for multiple associated detections and expectations. Then, each difference is squared, and the squares are summed. Finally, the sum of the squares is divided by the number of differences. The statistical variance $\hat{y}$ of the vertical difference is computed in a similar manner, using the difference in the vertical locations. The statistical variance $\hat{w}$ of the difference in the width is computed in a similar manner, using the difference in widths. The statistical variance $\hat{h}$ of the difference in the height is computed in a similar manner, using the difference in heights.

Then, given the predetermined variances, the spatial difference may be computed using the Kalman gating function:

$$\text{spatial\_difference} = \frac{(x\_detection - x\_expectation)^2}{\hat{x}} + \frac{(y\_detection - y\_expectation)^2}{\hat{y}} + \frac{(w\_detection - w\_expectation)^2}{\hat{w}} + \frac{(h\_detection - h\_expectation)^2}{\hat{h}} \quad (3)$$

The spatial difference is small if the detection and the expectation are similar spatially, and large if they are dissimilar. The spatial difference has some important properties. Statistically, the difference between the expectation and the corresponding detection should be within approximately one standard deviation. Dividing each component's square of the difference by the variance scales the error such that the contribution to the spatial difference is 1.0 unit for each component. The calculated spatial difference should be less than the number of measured components if the detection corresponds to the expectation. In this arrangement, the number of measured components is 4.0 and is equal to a predetermined spatial difference threshold.

Following in the spirit of the spatial difference function, the visual difference between the signature of the track and the signature of the detection is scaled such that the scaled visual difference should be less than a predetermined scaled visual difference threshold, say 1.0, for a valid combination of the signature of the track and the signature of the detection. In one arrangement, the visual difference is multiplied by a predetermined visual multiplier, say 50. Then, the scaled visual difference is given by:

$$\text{scaled\_visual\_difference} = \text{visual\_difference} \times \text{visual\_multiplier} \quad (4)$$

The visual multiplier has a similar scaling effect to applying statistical variances of width, height, and position to the respective differences.

To compute a combined difference between a detection and the expectation of a track, the scaled visual difference is added to the spatial difference, which is:

$$\text{combined\_difference} = \text{spatial\_difference} + \text{scaled\_visual\_difference} \quad (5)$$

The combined difference should be less than a predetermined combined difference threshold for a valid combination of a track and a detection. In one implementation, a combined difference threshold of 5.0 is utilised. The value of the threshold depends on the particular application.

FIG. 1 is a flow diagram of a process 100 for tracking objects over multiple cameras for one time instant, corresponding to a single frame captured by each camera. The cameras may be calibrated or un-calibrated. The cameras may operate at different frame rates and, hence, frames received from the cameras may not be captured simultaneously. The process can be repeated over successive frames, thus achieving tracking of objects over time.

Figure 2:
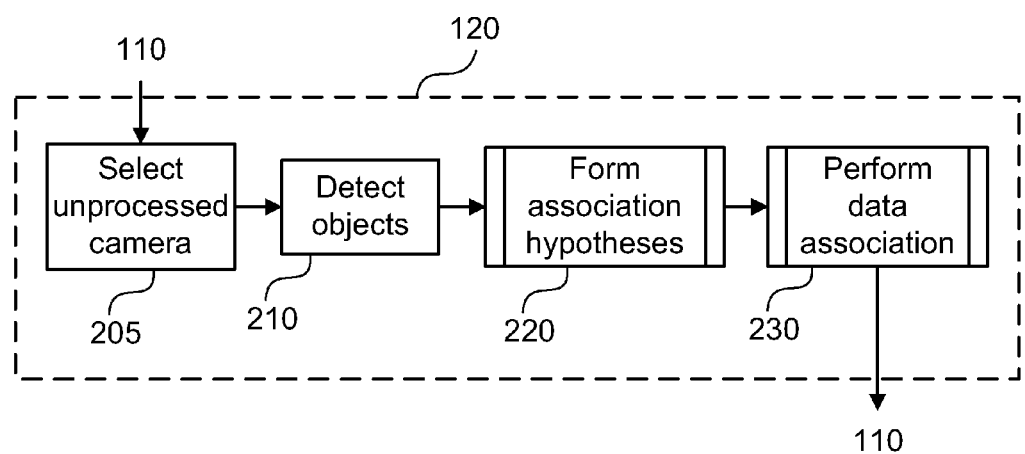
FIG. 2 is a schematic flow diagram illustrating a method of tracking within a single camera.
Figure 6:
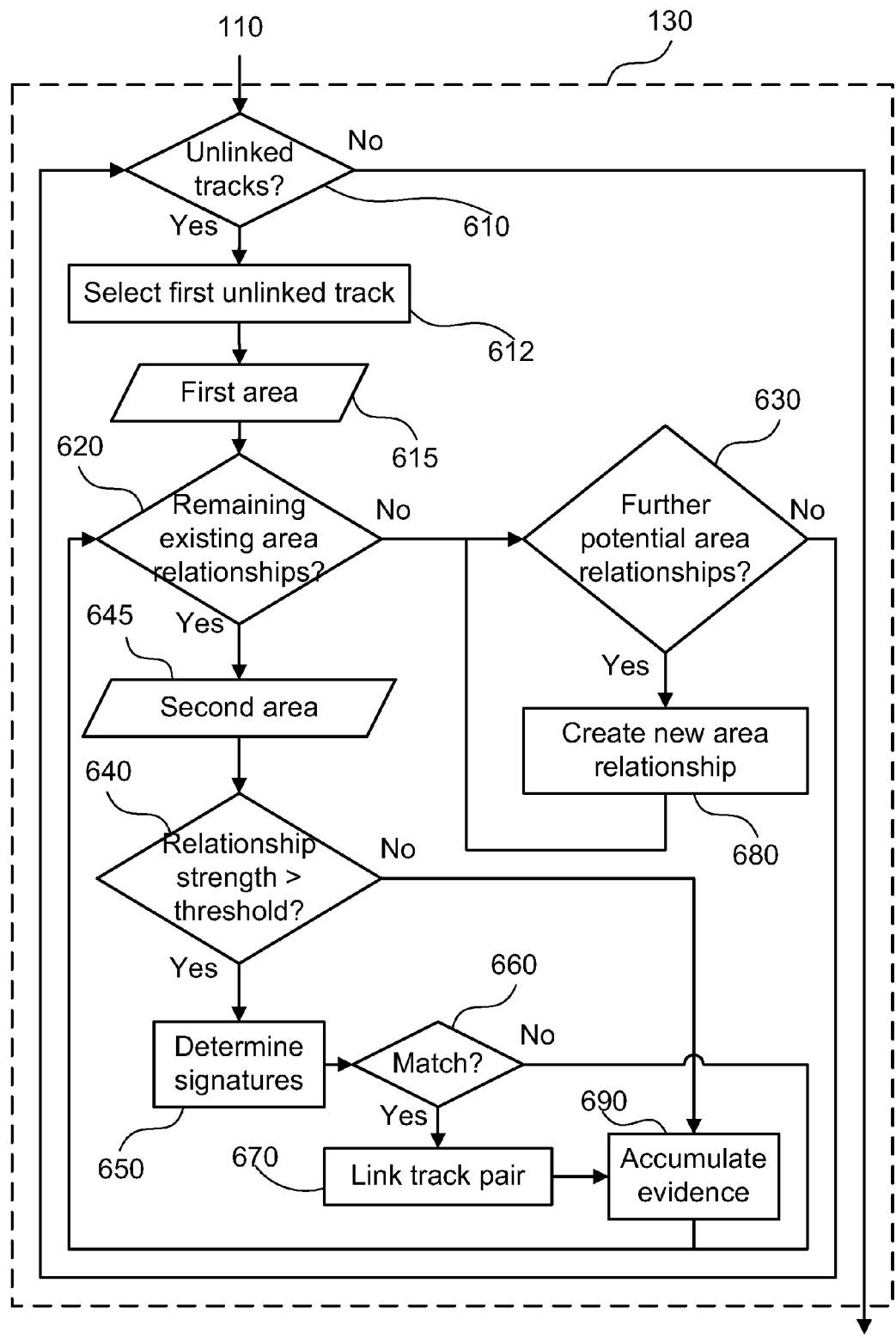
FIG. 6 is a schematic flow diagram illustrating a method of determining tracks representing the same real-world object.

The multiple camera object tracking process 100 begins a start module 105. Control passes to remaining unprocessed cameras decision step 110, which determines whether there are remaining cameras for which object detection and tracking is to be performed at the given time instant. If there are remaining cameras for which object detection and tracking is yet to be performed at the given time instant, Yes, control passes to a single camera object tracking module step 120, which selects an unprocessed camera and tracks objects in a field of view of the selected camera for the frame being processed. The functionality of the single camera object tracking module step 120 is illustrated in FIG. 2 and described in detail later. Otherwise, if at step 110 there are no remaining cameras for which object detection and tracking is yet to be performed at the given time instant, No, control passes to a track linker step 130, which examines the tracks from each camera and determines which tracks represent the same real-world object. The track linker step 130 then links those tracks as representing the same real-world object. The functionality of the track linker step 130 is illustrated in FIG. 6 and described in detail later. After tracks have been linked, control passes to a tracking information output module step 140, which outputs tracking data from the system. In one arrangement in which the functionality of the single camera object tracking module step 120 is performed on a computer, tracking information output from step 140 is provided to the cameras. In another arrangement in which the functionality of the single camera object tracking module step 120 is performed by the cameras, tracking information output from step 140 is provided to a computer for further processing. In another arrangement in which the functionality of the single camera object tracking module step 120 is performed by the cameras, tracking information output from step 140 is exchanged among the cameras performing the tracking. In one arrangement, tracking information output from step 140 is provided to a computer that is external to the system that includes the device which performs the tracking. Such an external computer may be remotely located from the system and may be connected, for example, by a communications network, such as the Internet. After the tracking information output module step 140, the process 100 is complete and control passes to an End module 199 and the process 100 terminates.

Tracking within a Single Camera

FIG. 2 is a flow diagram illustrating a method for performing the functionality of the single camera object tracking module step 120 of FIG. 1. In one arrangement, the single camera object tracking module step 120 receives video frame information from a camera and the method of the single camera object tracking module step 120 is performed on a computer, wherein a processor executes instructions from a program stored on a computer-readable medium. In another arrangement, the method of the single camera object tracking module step 120 is implemented on the camera that is capturing the video frame information. In one such arrangement, the camera includes a processor for executing computer program instructions to perform the method of the single camera object tracking module step 120. In another arrangement, the method of the single camera object tracking module step 120 is implemented on another camera that is different from the camera that is capturing the video frame information.

In a first step of FIG. 2, a camera selection module step 205 selects a camera that is yet to be processed by the single camera object tracking module step 120. Then, control passes to an object detection module step 210, which receives a video frame captured by the camera selected in step 205 and detects foreground objects within the video frame. In one arrangement, the object detection module step 210 stores and updates a background model, and foreground objects are detected using background subtraction, in accordance with the previously-described foreground separation method.

Next, control passes to an association hypotheses forming module step 220, which compares the detections to existing tracks and creates and outputs association hypotheses that describe possible matches between the detections and the existing tracks. A combined difference score is computed for each association hypothesis, as described previously with reference to Equation (5). Thus, each association hypothesis is associated with a combined difference score. Next, control passes from step 220 to a data-association performing step 230, which is described in more detail with reference to FIG. 4. The method performed in the single camera object tracking module step 120 of FIG. 1 then completes and control returns to the remaining unprocessed cameras decision step 110 of FIG. 1.

Figure 3:
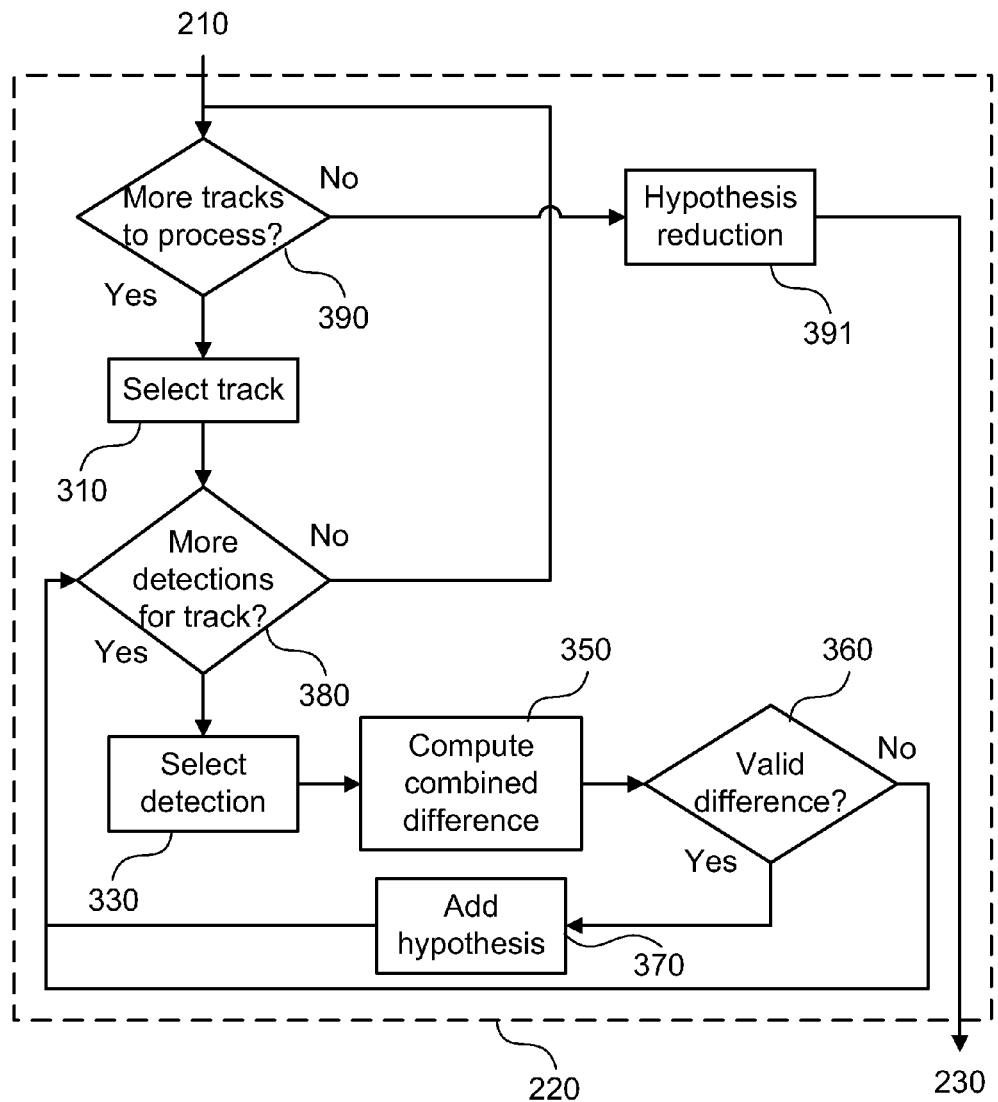
FIG. 3 is a schematic flow diagram illustrating in detail a method of creating association hypotheses in tracking within a single camera.

FIG. 3 is a flow diagram illustrating a method for performing the functionality of the association hypotheses forming module step 220 of FIG. 2. Objects detected in the object detection module 210 are presented to the association hypotheses forming module step 220 and a further track decision module step 390 determines whether there are any tracks yet to be processed by the association hypotheses forming module step 220 at this time. If there are more tracks to be processed in this frame, Yes, control passes to a track selection module step 310. Otherwise, if there are no more tracks to be processed in this frame, No, control passes to an association hypothesis reduction module step 391.

When there are more tracks to be processed, Yes, control passes from step 390 to the track selection module step 310, which selects a track that has not yet been processed at this time by the association hypotheses forming module step 220. Control then passes to a further detection decision module step 380, which determines whether there is any detection that is yet to be processed in combination with the selected track. If there are more detections to be processed in combination with the selected track at this time, Yes, control passes to a detection selection module step 330. However, if at step 380 there is no more detection to be processed in combination with the selected track at this time, No, control returns to the further track decision module step 390.

The detection selection module step 330 selects a detection that has not yet been processed in combination with the selected track. Next, control passes to a combined difference computing module step 350, which computes a combined difference between the selected track and the selected detection. As described previously, the combined difference incorporates the spatial difference and the scaled visual difference. Control passes from step 350 to a combined difference thresholder decision step 360, which receives the combined difference and determines whether there is a valid difference between the received combined difference and a predefined combined difference threshold. The predetermined combined difference threshold may be user-defined or dependent on one or more variables or computations, depending on the particular application. If the combined difference is greater than the predetermined combined difference threshold, and thus no valid difference exists, No, the selected detection cannot be matched to the selected track and control returns to the further detection decision module step 380. If the combined difference is less than or equal to the combined difference threshold, and thus there is a valid difference, Yes, control passes from the combined difference thresholder decision step 360 to an association hypothesis adding module step 370. The association hypothesis adding module step 370 forms a new association hypothesis representing a potential association between the selected track and the selected detection. The association hypothesis adding module step 370 then passes control to the further detection decision module step 380.

When there are no more tracks to process, control passes from decision step 390 to the association hypothesis reduction module step 391, which reduces the association hypotheses generated in step 370 to a non-contradictory subset. In the non-contradictory subset of association hypotheses, each detection appears in at most one association hypothesis and each track appears in at most one association hypothesis. In one arrangement, the Global Nearest Neighbour (GNN) approach is used to reduce the set of association hypotheses. Global Nearest Neighbour is an iterative, greedy algorithm that, in this application, selects the association hypothesis with the lowest combined difference from the input set and places the selected association hypothesis in the optimal set. All other association hypotheses that contain the same track or the same detection represented by the selected association hypothesis are then deleted from the input set of association hypotheses. This is because selecting the other association hypotheses that contain the same track or the same detection represented by the selected association hypothesis at a later time would create contradictions by matching multiple tracks to a single detection, or multiple detections to a single track. In another arrangement, every possible combination of association hypotheses is evaluated to find a globally-optimal non-contradictory subset (according to the similarity measure). Evaluating every possible combination of association hypotheses can be computationally expensive. Upon completion of hypothesis reduction module 391 within association hypotheses forming module 220, control passes to the data association module 230 of FIG. 2.

Data Association

Figure 4:
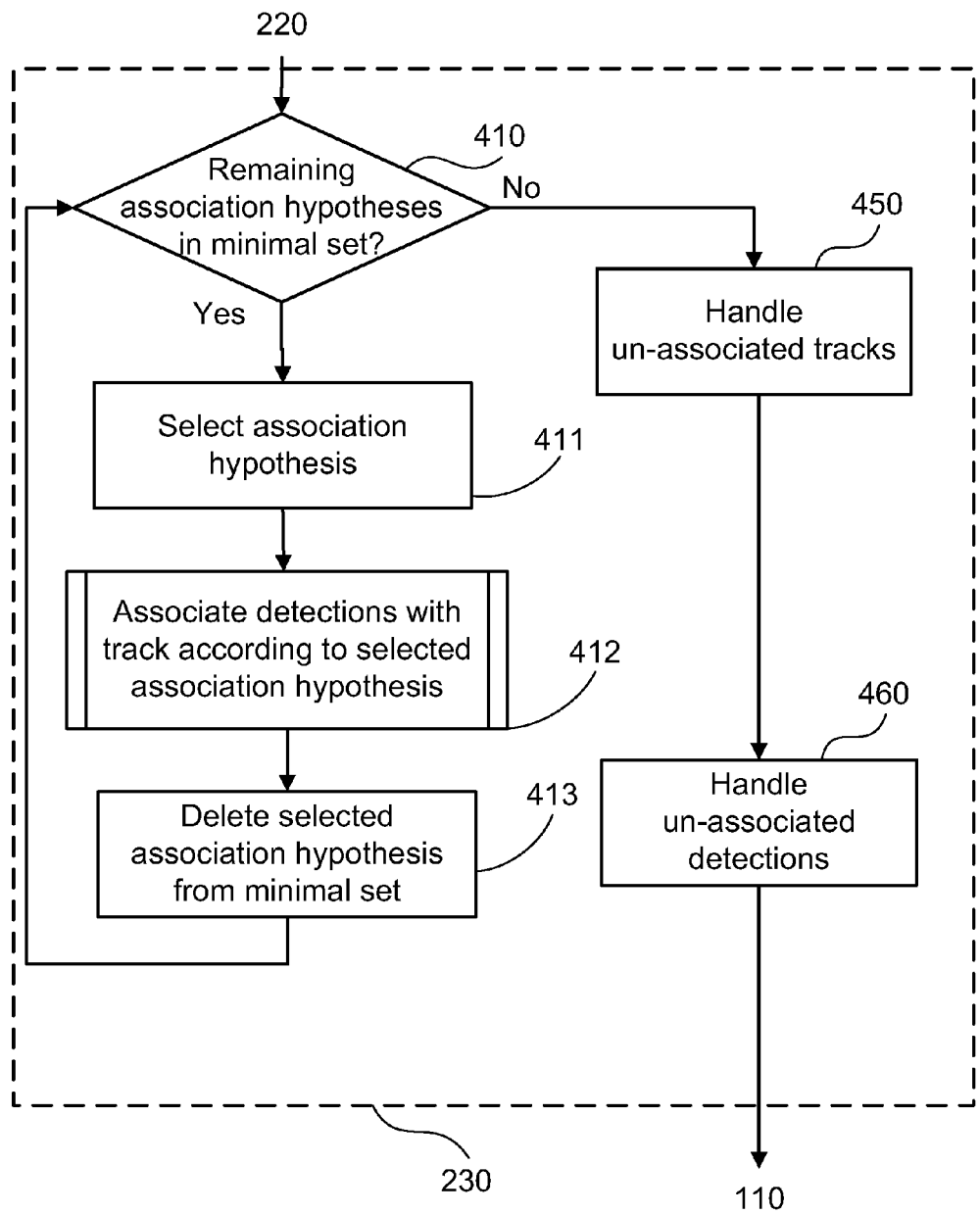
FIG. 4 is a schematic flow diagram illustrating in detail a method of data association for tracking within a single camera.

FIG. 4 is a flow diagram illustrating a method for performing the functionality of the data association module step 230 of FIG. 2. As shown in FIG. 2, the data association module step 230 receives an input from the association hypotheses forming module 220. First, in a remaining hypotheses decision step 410 of FIG. 4, a test is performed to determine whether there are association hypotheses to be processed remaining in the minimal non-contradictory subset. If there is an association hypothesis remaining, Yes, control passes to a hypothesis selection module 411, which selects an association hypothesis from the minimal set of non-contradictory association hypotheses. Control then passes to a detection/track association module step 412, in which the detections represented in the selected association hypothesis are associated with the track represented in the selected association hypothesis. Detection/track association module 412 is described in more detail with reference to FIG. 5. Control passes to association hypothesis deletion step 413, which deletes the selected association hypothesis from the minimal set, in order to avoid duplicate associations. Upon deletion of the selected association hypothesis in association hypothesis deletion step 413, the process returns to the decision step 410 and further association hypotheses are processed, if available. If at step 410 there are no remaining association hypotheses in the minimal set, No, control passes to an un-associated track processing step 450. A method of processing un-associated tracks is described later. Control then passes to an un-associated detection processing module step 460 and step 230 terminates.

Figure 5:
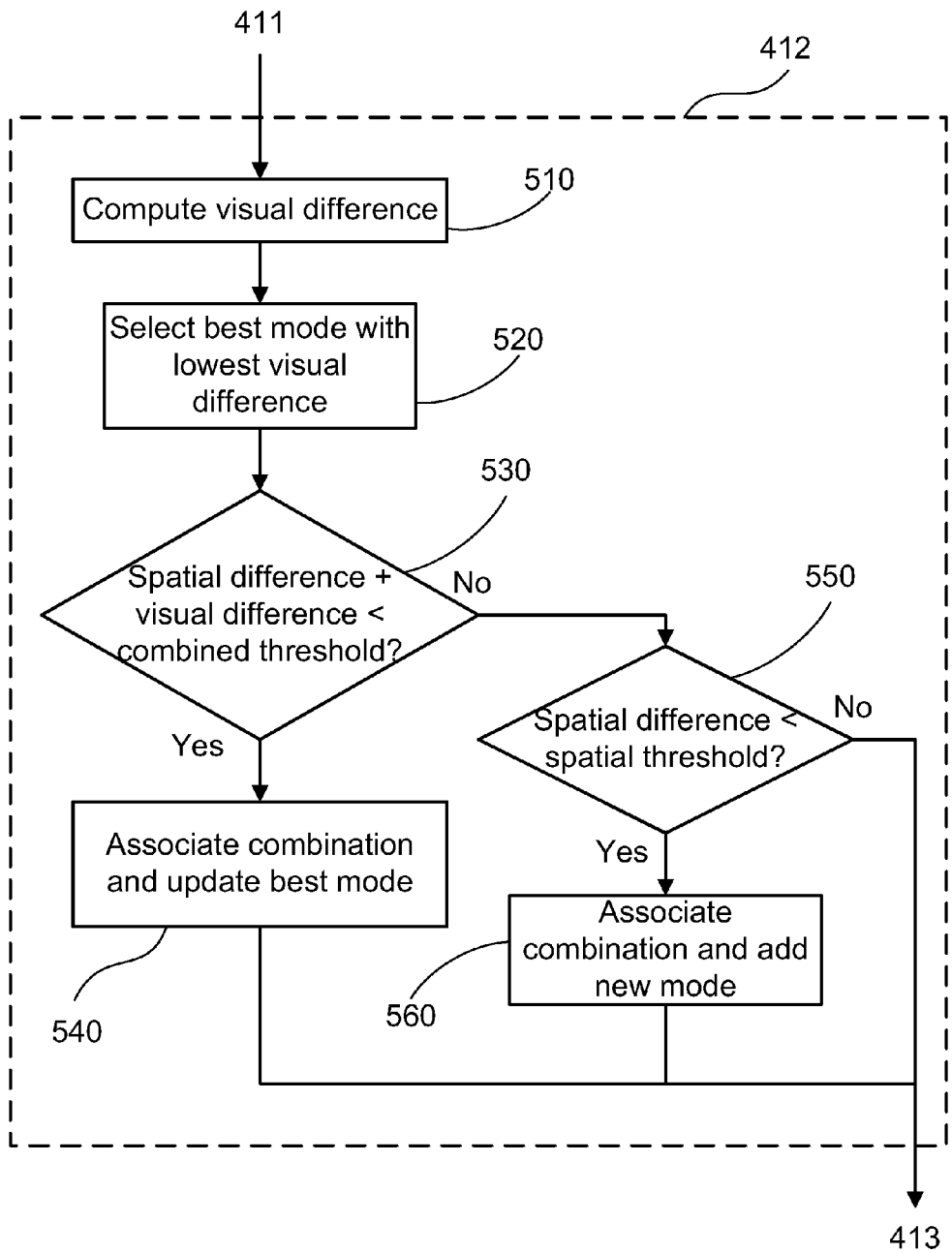
FIG. 5 is a schematic flow diagram illustrating a method of associating detections with tracks in tracking within a single camera.

FIG. 5 is a flow diagram illustrating a method for implementing the functionality of the detection/track association module step 412 of FIG. 4. In one arrangement, multi-modal signatures are maintained by each track. In one arrangement, each mode of the multi-modal signature is a concatenated histogram, where each mode represents one appearance summary of an object. Therefore, a multi-modal signature maintains multiple appearance summaries of an object. The detection/track association module step 412 acts on a selected association hypothesis. First, step 510 computes a scaled visual difference between each mode of the signature of the track represented by the selected association hypothesis and the representative signature of the combination of detections represented by the selected association hypothesis. Control passes to step 520, which selects the mode resulting in the lowest scaled visual difference and marks the selected mode as the best mode. Then, in decision step 530, if the combined spatial difference is less than the predetermined combined difference threshold, Yes, then control passes to a first association module 540. First association module 540 associates the combination with the track and updates the statistics of the best mode. In one arrangement of updating the statistics, the association count of the best mode is increased by one and the most recent frame is set to be equal to the current frame. In one arrangement of updating the best mode, the best mode of the multi-modal signature is combined with the representative signature using a weighted average. In another arrangement of updating the best mode, the best mode of the multi-modal signature is not modified. In yet another arrangement of updating the best mode, the best mode of the multi-modal signature is updated only if the scaled visual difference between resulting updated best mode and all other modes is above a predetermined mode distance threshold, for example, 1.0. Applying the predetermined mode distance threshold ensures that each mode represents significantly different appearances. Control then passes from step 540 to association hypothesis deletion step 413.

If in the first decision step 530 the combined difference is not less than the predetermined combined difference threshold, No, control passes from step 530 to a second decision step 550. If in second decision 550 the spatial difference is less than a predetermined spatial difference threshold, Yes, control passes to a second association module 560. The second association module 560 associates the combination with the track and creates a new mode in the multi-modal signature using the representative combination.

In one arrangement, the maximum number of modes is a constant, in which case it is sometimes necessary to delete a mode before creating a new mode. The stored statistics of each mode are used in determining which mode should be deleted. In one arrangement, a survival score is computed. First, the existence time is determined by subtracting the creation frame from the frame number of the current frame. Next, the inactivity time is determined by subtracting the most recent association frame from the frame number of the current frame. Then, the survival score s is the association count divided by the product of the existence time and the inactivity time, i.e.:

$$s = \frac{\text{association\_count}}{\text{existence\_time} \times \text{inactivity\_time}} \quad (6)$$

The mode with the lowest survival score is then deleted. In creating the new mode, the statistics of that mode are initialised. The association count of the new mode is set to 1. The creation frame of the new mode and the last seen frame of the new mode are set to the frame number of the current frame.

If in the second decision 550 the spatial difference is not less than the predetermined spatial difference threshold, No, the combination cannot be associated with the track and the association hypothesis is discarded. Control then passes from step 550 to association hypothesis deletion step 413.

Handling Un-Associated Tracks

There may be some remaining tracks that are not associated with any detection according to the minimal set of non-contradictory association hypotheses. Further processing can be performed on these remaining tracks. The additional un-associated track processing step 450 of FIG. 4 is executed to process any tracks which are not associated with any detections by any of the selected association hypotheses.

In one arrangement, the tracker handles the case where a track is not associated with any detection for a number of consecutive frames. The tracker can produce expectations in later frames. In one arrangement, the multi-modal signature of the track is not modified when the track is not associated with a detection in a frame. In another arrangement, the multi-modal signature of the track is updated using a prediction method when the track is not associated with a detection in a frame. In one arrangement, the prediction method updates the most recently associated mode using the most recently associated representative signature.

The number of consecutive frames where no detections have been associated with the track may exceed a predetermined un-associated track existence threshold, say 5. If the un-associated track existence threshold is exceeded for a given track, the tracker will no longer attempt to associate detections with the track.

False positive detections may be made on occasion, in a manner whereby typically such false positive detections are only generated for a small number of consecutive frames. In one arrangement, tracks that contain a number of associations below a predetermined false positive track length threshold, say 5 frames, are revoked. In one arrangement, revoking means that the tracks will not be processed in future frames. In another arrangement, the tracker deletes all traces of the existence of the tracks.

Handling Un-Associated Detections

Similarly to the un-associated track processing step 450, there may be some remaining detections that are not associated with any tracks according to the minimal set of association hypotheses. These remaining detections are processed by the un-associated detection processing module 460 of FIG. 4. In one arrangement, a new track is created for each remaining detection. The track signature is initialised with one mode, with the mode equal to the representative signature. This process is incorporated into the un-associated detection processing module 460. In another arrangement, a new track is created only if the size of the spatial representation of a detection is above a predetermined detection size threshold. An example of the predetermined detection size threshold is 15 DCT blocks for a frame with dimensions of 96×72 blocks, or 100 pixels for a frame with dimensions 320×240 pixels. In another arrangement, the detection size threshold is a percentage, say 0.2%, of the number of blocks or pixels in the frame.

Multiple-Camera Tracking: Location-Based Signature Selection Method

Figure 9:
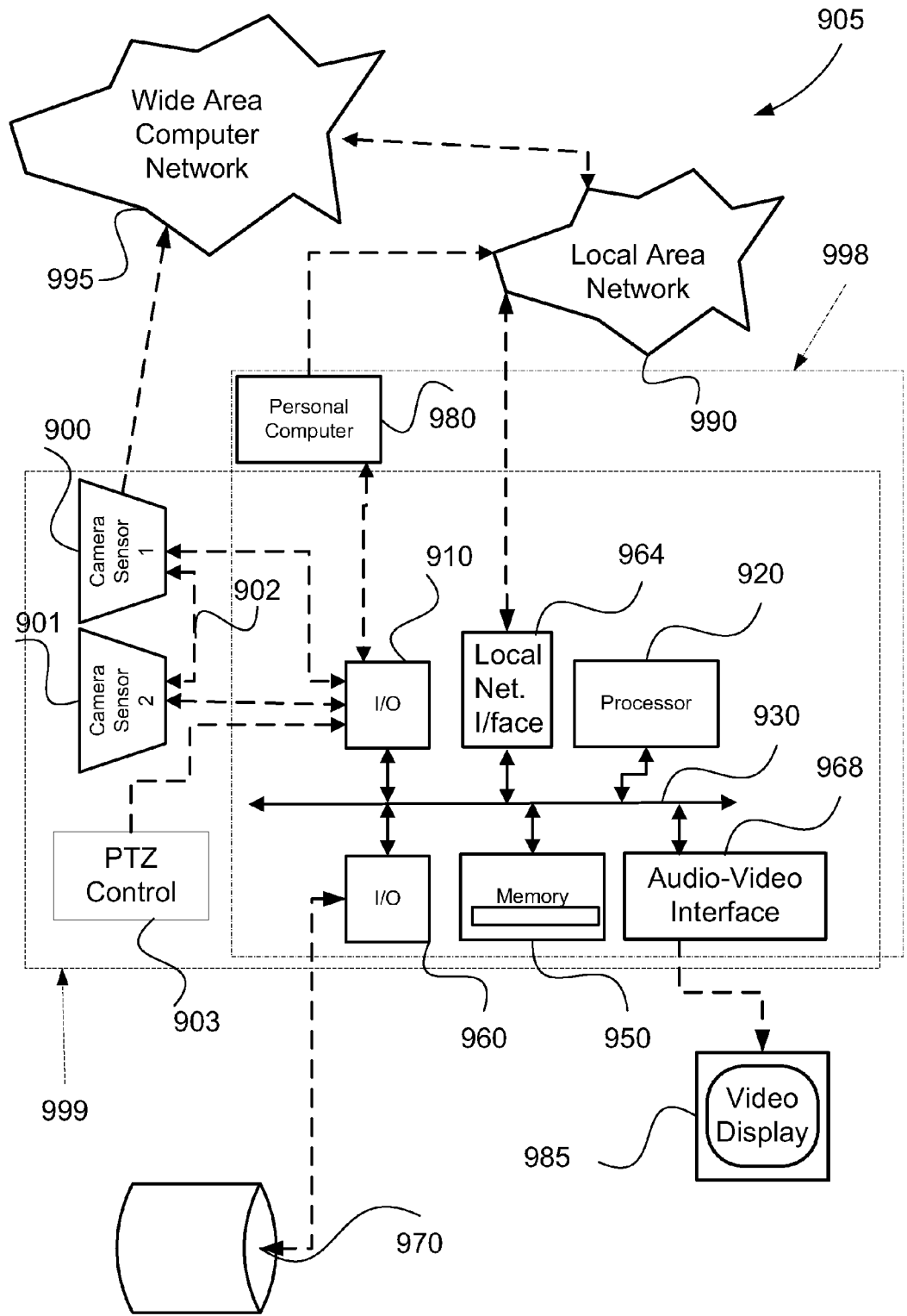
FIG. 9 shows an electronic system implementing the disclosed location-based signature matching method.

FIG. 9 shows an electronic system 905 for effecting the disclosed Location-Based signature selection tracking method. Sensors 900 and 901 are used to obtain the images of the image sequence. Each sensor may represent a stand alone sensor device (i.e., a detector or a security camera) or be part of an imaging device, such as a camera, a mobile phone, etc. In one implementation, the electronic system 905 is a camera system and each sensor 900 and 901 includes a lens system and an associated camera module coupled to the lens system, wherein the camera module stores images captured by the lens system. In one arrangement, the pan and tilt angles and the zoom of each sensor are controlled by a pan-tilt-zoom controller 903. The remaining electronic elements 910 to 968 may also be part of the imaging device comprising sensors 900 and 901, as indicated by dotted line 999. The electronic elements 910 to 968 may also be part of a computer system that is located either locally or remotely with respect to sensors 900 and 901. In the case indicated by dotted line 998, electronic elements form a part of a personal computer 980.

The transmission of the images from the sensors 900 and 901 to the processing electronics 920 to 968 is facilitated by an input/output interface 910, which could be a serial bus compliant with Universal Serial Bus (USB) standards and having corresponding USB connectors. Alternatively, the image sequence may be retrieved from camera sensors 900 and 901 via Local Area Network 990 or Wide Area Network 995. The image sequence may also be downloaded from a local storage device (e.g., 970), that can include SIM card, SD card, USB memory card, etc.

The sensors 900 and 901 are able to communicate directly with each other via sensor communication link 902. One example of sensor 900 communicating directly with sensor 901 via sensor communication link 902 is when sensor 900 maintains its own database of spatial regions and corresponding brightness values; sensor 900 can then communicate this information directly to sensor 901, or vice versa.

The images are obtained by input/output interface 910 and sent to the memory 950 or another of the processing elements 920 to 968 via a system bus 930. The processor 920 is arranged to retrieve the sequence of images from sensors 900 and 901 or from memory 950. The processor 920 is also arranged to fetch, decode and execute all steps of the disclosed method. The processor 920 then records the results from the respective operations to memory 950, again using system bus 930. Apart from memory 950, the output could also be stored more permanently on a storage device 970, via an input/output interface 960. The same output may also be sent, via network interface 964, either to a remote server which may be part of the network 990 or 995, or to personal computer 980, using input/output interface 910. The output may also be displayed for human viewing, using AV interface 968, on a monitor 985. Alternatively, the output may be processed further. One example of further processing may include using the output data, written back to memory 950, memory 970 or computer 980, as the input to a background modelling system.

As described above and indicated in FIG. 9, the above method may be embodied in various forms. In one embodiment, indicated by rectangle 999, the method is implemented in an imaging device, such as a camera, a camera system having multiple cameras, a network camera, or a mobile phone with a camera. In this case, all the processing electronics 910 to 968 will be part of the imaging device, as indicated by rectangle 999. As already mentioned in the above description, such an imaging device for capturing a sequence of images and tracking objects through the captured images will include: sensors 900 and 901, memory 950, a processor 920, an input/output interface 910, and a system bus 930. The sensors 900 and 901 are arranged for capturing the sequence of images in which objects will be tracked. The memory 950 is used for storing the sequence of images, the objects detected within the images, the track data of the tracked objects and the signatures of the tracks. The processor 920 is arranged for receiving, from the sensors 900 and 901 or from the memory 950, the sequence of images, the objects detected within the images, the track data of the tracked objects and the signatures of the tracks. The processor 920 also detects the objects within the images of the image sequences and associates the detected objects with tracks.

The input/output interface 910 facilitates the transmitting of the image sequences from the sensors 900 and 901 to the memory 950 and to the processor 920. The input/output interface 910 also facilitates the transmitting of pan-tilt-zoom commands from the PTZ controller 903 to the sensors 900 and 901. The system bus 930 transmits data between the input/output interface 910 and the processor 920.

FIG. 6 is a flow diagram illustrating the location-based signature selection method for multi-camera tracking performed by track linker 130 of FIG. 1. Track linker 130 examines the tracks derived from objects detected in frames received from each camera and determines which tracks represent, or are considered to represent within a predetermined degree of probability, the same real-world object. Unlinked tracks decision 610 receives control from remaining unprocessed cameras decision step 110. The unlinked tracks decision step 610 examines the tracks received from all cameras. An unlinked track is a track for which no corresponding track representing the same real-world object has been determined for any other camera. If there are no unlinked tracks that are yet to be processed by track linker 130, No, control passes from step 610 to tracking information output module 140. Otherwise, there are unlinked tracks still to be processed and control is passed to unlinked track selection step 612. Unlinked track selection step 612 selects a first unlinked track. Control then passes to step 615, which receives the selected track from step 612 and uses the track to determine a first area, wherein the first area is the area most similar to the bounding box of the object in the most recent frame. In one arrangement, first area 615 is the bounding box of a detection associated with the first track. In another arrangement, first area 615 is an existing registered area, which exhibits significant similarity to the bounding box of a detection associated with the first track or is most similar to the bounding box of the object in the most recent frame. Registered areas and the computation of a similarity between a bounding box and a registered area are discussed in detail later. In one arrangement, first area 615 is determined using the bounding box of the most recent detection associated with the first track. In another arrangement, first area 615 is determined using the bounding box of a detection associated with the first track prior to the most recent detection being associated with the first track. After first area 615 is determined, control is passed to existing area relationship decision step 620, which examines the first area determined in step 615 to determine if there are any existing area relationships between the first area and any other areas from frames that have previously been processed. The other areas are based on objects detected within those frames, wherein the frames are derived from the same camera or from other cameras.

An area relationship is a relationship between two areas. As indicated above, an area is a portion of a frame and thus corresponds to a location within the field of view of a camera. An area relationship between two areas indicates that an object produces similar signatures whilst visible within each area. Therefore, when determining whether two tracks correspond to the same real-world object, it is preferable to use signatures from two areas with a known area relationship which are known to exhibit similarity in appearance. Any given area may have multiple area relationships. For example, for each pairing of cameras, there may be one area relationship per possible camera pairing or for a given pairing of cameras, there may be multiple area relationships. An area relationship may also exist between a pair of areas in the field of view of the same camera. Such an area relationship may exist, for example, to handle the case where an object being tracked becomes occluded before later reappearing elsewhere in the scene.

FIG. 7 illustrates a sequence of frames captured by two cameras surveilling a scene from different points of view. In the scene, a first person 703 walks through a first doorway 701 and then walks through a second doorway 702. The relative positions of the first doorway 701 and the second doorway 702 may be unknown. A first camera captures four sequential frames: first frame 710 at time t, second frame 720 at time t+1, third frame 730 at time t+2, and fourth frame 740 at time t+3. A second camera captures fifth frame 750 at time t+3, that is, at the same time that the first camera captures fourth frame 740. The second camera also captures a sixth frame 760 at time t+N later than time t+3, in which a second person 704 is visible as they walk through the second doorway 702.

The field of view of the first camera shows a scene that includes a room with the first doorway 701 in a first wall facing the first camera and the second doorway 702 on the left-hand side of the visible scene, wherein the second doorway 702 is in a second wall orthogonal to the first wall. The first frame 710 shows the first person 703 in the first doorway 701, wherein the first person 703 is facing the first camera. The first person 703 is represented by a first detection 713 with a first bounding box 711. The second frame 720 illustrates a profile view of the first person 703 represented by second detection 723, wherein the first person 703 has passed through the first doorway 701 and entered the room. The third frame 730 illustrates a profile view of the first person 703 moving towards the second doorway 702, represented by third detection 733. In the fourth frame 740, a profile view of the first person 703 in the second doorway 702 is viewed as fourth detection 743 with second bounding box 741.

The field of view of the second camera shows a scene captured from the other side of the second wall than that captured by the first camera. The field of view of the second camera includes a room with the second doorway 702 in a wall facing the second camera. In the fifth frame 750 captured by the second camera contemporaneously with the fourth frame 740, the first person 703 appears in the second doorway 702 represented by the fifth detection 753 containing a frontal view; the third bounding box 751 of the person is illustrated. In this example, an area relationship exists between the area of the third bounding box 751 and the area of the first bounding box 711, since both areas contain a frontal view of a person. An area relationship does not exist between the area of the third bounding box 751 and the area of the second bounding box 741 of the person 743 in the fourth frame 740, because the bounding boxes 751, 741 capture different views, and hence different signatures, of the first person 703.

Registered Areas

FIG. 7 also illustrates sixth frame 760 captured by the second camera, where a second person 704 is viewed as sixth detection 763 with fourth bounding box 761, as the second person passes through the second doorway 702. Sixth frame 760 occurs later in time than fifth frame 750. Note that the third bounding box 751 exhibits a similarity to the fourth bounding box 761, since the third bounding box 751 and the fourth bounding box 761 are of similar size and position. In one arrangement, a registered area is an area of video frame, such as, for example, a bounding box, which is used to approximate another area. Hence, the third bounding box 751 can be used to approximate the fourth bounding box 761. As a result, any area relationship associated with the third bounding box 751 also applies to the fourth bounding box 761, since the third bounding box 751 and the fourth bounding box 761 have sufficiently similar spatial characteristics. A registered area is used to approximate a candidate bounding box if a calculated area difference measure is less than an area difference threshold, say 1.5. In one arrangement, the area difference to measure is derived from the positions of the centres of the registered area and the candidate bounding box, and the dimensions of the registered area and the candidate bounding box. Let d be the square of the Euclidean distance between the centre of the registered area $(x_r, y_r)$ and the centre of the candidate bounding box $(x_c, y_c)$, i.e.:

$$d = (x_r - x_c)^2 + (y_r - y_c)^2 \qquad (7)$$

Also, let $\theta$ denote the angle of elevation between the centres of the bounding boxes, i.e.:

$$\theta = a\tan 2(y_r - y_c, x_r - x_c) \qquad (8)$$

where the a tan 2 function considers the sign of each argument and returns the quadrant-correct arctangent. Also, if we approximate a bounding box of dimensions (2 w, 2 h) using an ellipse with major and minor radii aligned with the (x,y) axes and with radius w along the x-axis and radius h along the y-radius, the radius $\rho$ of the ellipse at angle $\theta$ is given by:

$$\rho^2 = \frac{w^2 h^2}{h^2 \cos^2\theta \times w^2 \sin^2\theta} \qquad (9)$$

Let $\rho_r$ denote the radius at angle $\theta$ of the ellipse approximating the registered area and let $\rho_c$ denote the radius at angle $\theta$ of the ellipse approximating the candidate bounding box. Then, the area difference measure is given by:

$$\text{area\_difference} = \frac{d^2}{\min(\rho_r^2, \rho_c^2)} \qquad (10)$$

By using registered areas to approximate a candidate bounding box, area relationships incorporating the registered area can be used with the candidate bounding box even if the candidate bounding box is not identical to the registered area. This provides an advantage in efficiency since fewer area relationships are necessary, and an advantage in robustness since more linked tracks contribute to each area relationship.

Returning to FIG. 6, control passes from step 615 to a remaining existing area relationships decision step 620. If the first area determined in step 615 does not have any area relationships remaining to be processed, remaining area relationship decision step 620 passes control to a further potential area relationships decision step 630, to be described. If, at step 620, first area 615 has any area relationships remaining to be processed, Yes, remaining area relationship decision 620 selects an existing area relationship. Second area 645 is retrieved from a set of existing area relationships and has an area relationship with first area 615. The second area 645 is used to retrieve from a stored set of tracks the second track proposed to correspond to the same real-world object as the first track.

Relationship strength thresholder step 640 receives an existing area relationship between the first area 615 and the second area 645. If the existing area relationship does not have a relationship strength above a predefined relationship strength threshold, say 5.0, relationship strength thresholder 640 passes control to evidence accumulation module 690, which is described in detail later. The relationship strength threshold is used to ensure that area relationships created by error due to a coincidence in appearance similarity do not propagate further errors in linking tracks. The relationship strength is discussed in further detail later. If at step 640 the existing area relationship between the first area 615 and the second area 645 has a relationship strength above the relationship strength threshold, control passes to signature determination module 650. Signature determination module 650 determines a first signature from the first track corresponding to the first area 615, and a second signature from the second track corresponding to the second area 645. The first signature and the second signature are then passed to a matching module 660.

The matching module 660 determines a correspondence between the first track and the second track that indicates, within a degree of probability, whether the first track and the second track correspond to the same real-world object. In one arrangement, determining the correspondence includes calculating an appearance similarity. In another arrangement, determining the correspondence includes calculating an appearance similarity and a temporal similarity. In yet another arrangement, determining the correspondence includes calculating an appearance similarity and a spatio-temporal similarity.

In one arrangement, the appearance similarity is derived from the scaled visual difference between the first signature and the second signature:

$$\text{appearance\_similarity} = \begin{cases} 1 - \text{scaled\_visual\_difference}, & \text{if scaled\_visual\_difference} < 1 \\ 0, & \text{otherwise} \end{cases} \quad (11)$$

In one arrangement, the temporal similarity score is computed by:

$$\text{temporal\_similarity} = \begin{cases} 1, & \text{if } \sigma_t = 0 \\ \exp\left(-\frac{(t-\bar{t})^2}{\sigma_t^2}\right), & \text{otherwise,} \end{cases} \quad (12)$$

where t is the transit time between the first track passing through the first area 615 and the second track passing through the second area 645, and $\bar{t}$ and $s_t$ are the mean and standard deviation, respectively, of the set of transit times for the existing area relationship. The temporal similarity measures how consistently the observed transit time between the first area 615 and the second area 645 matches the historically observed transit times stored in the existing area relationship.

In one arrangement, the spatio-temporal similarity is the result of multiplying a first spatial similarity, a second spatial similarity, and a temporal similarity. The temporal similarity is computed as described above. The first spatial similarity is derived from a minimum area difference between first area 615 and a registered area where:

$$\text{first\_spatial\_similarity} = \quad (13)$$
$$\begin{cases} 1 - \text{area\_difference} * \frac{2}{3}, & \text{if area\_difference} < 1.5 \\ 0, & \text{otherwise} \end{cases}$$

Similarly, the second spatial similarity is derived from the minimum area difference between second area 615 and a registered area.

Control passes from step 650 to a matching decision step 660. In one arrangement, if the appearance similarity is above a predefined appearance similarity threshold, say 0, matching module 660 determines that a match exists, Yes, and passes control to a track pair linking module 670. If the appearance similarity is not above the predefined appearance similarity threshold, there is not a match, No, and matching module 660 returns control to remaining area relationships decision 620.

In another arrangement, the matching module 660 determines whether there is a match based on whether the product of the appearance similarity and the temporal similarity is above a predefined appearance-temporal threshold, say 0.5. If the product of the appearance similarity and the temporal similarity is above the predefined appearance-temporal threshold, the matching module 660 passes control to track pair linking module 670. If the product of the appearance similarity and the temporal similarity is not above the predefined appearance-temporal threshold, matching module 660 returns control to remaining area relationships decision 620.

In yet another arrangement, the matching module 660 determines whether there is a match based on whether the product of the appearance similarity and the spatio-temporal similarity is above a predefined appearance-spatio-temporal threshold, say 0.25. If the product of the appearance similarity and the spatio-temporal similarity is above the predefined appearance-spatio-temporal threshold, matching module 660 passes control to track pair linking module 670. If the product of the appearance similarity and the spatio-temporal similarity is not above the predefined appearance-spatio-temporal threshold, matching module 660 returns control to remaining area relationships decision 620.

Track pair linking module 670 links the first track and the second track that are considered to correspond to the same real-world object. Further processing can also occur. In one arrangement, where each track stores a multi-modal signature, signature modes are transferred between the first track and the second track. For example, consider an appearance of an object that is associated with the first track but not associated with the second track, such as a frontal view of a person. Transferring the signature mode corresponding to this appearance from the first track to the second track improves the likelihood of correctly associating the second track with a detection having a signature represented by the transferred mode in future frames. Therefore, transferring signature modes between tracks provides for more robust tracking. In one arrangement, each signature mode is ranked according to a ranking score. In one arrangement, the ranking score is determined from the number of times a signature mode has been used in associating a detection with an object.

In one arrangement, the first track is linked with the second track. The first track provides a transferred signature mode to the second track. Consider a third track that is linked with the second track, but which is not linked with the first track. For example, the first track and the third track may be separated by more than a maximum temporal difference and hence cannot be linked. The maximum temporal difference is described later. The transferred signature mode can be transferred from the second track to the third track. Therefore, because the second track shares links with both the first track and the third track, the transferred signature mode is transitively transferred from the first track to the third track.

After linking pairs of tracks and transferring signature modes between the first track and the second track, track pair linking module 670 passes control to evidence accumulation module 690.

Accumulation module 690 updates the area relationship statistics of the existing area relationship. The area relationship statistics may include the mean transit time, the standard deviation of the transit time and relationship strength. Firstly, the transit time to between the first area 615 and the second area 645 is computed, wherein the transit time is the time difference between the first track passing through the first area 615 and the second track passing through the second area 645. Then, the transit time is appended to the set of transit times for the existing area relationship. The mean transit time of existing area relationship is the mean of the set of transit times. The standard deviation of the transit time of the existing area relationship is the standard deviation of the set of transit times.

Next, the relationship strength of the existing area relationship is updated. The relationship strength is replaced by the sum of the previous relationship strength and the appearance similarity between the first signature and the second signature.

After the completion of accumulation module 690, control then returns to the unlinked tracks decision step 620.

Returning to the remaining area relationship decision step 620, if the first area 615 does not have any further existing area relationships, No, further potential area relationships decision 630 is called. Further potential area relationships decision step 630 examines whether a new area relationship can be formed for first area 615. In one arrangement, all frames from all tracks from all cameras are examined. In another arrangement, only frames that have been recorded within a maximum temporal difference are examined. In one arrangement, the maximum temporal difference is a constant number of frames, for example, 500 frames. In another arrangement, the maximum temporal difference is a constant amount of time, for example, 20 seconds. In one arrangement, the frame rate is constant. In another arrangement, the frame rate is variable. If at step 630 there is a frame that has not been examined in conjunction with the first track, a frame is selected and the selected frame is provided to a new area relationship creator step 680.

For the selected frame, the new area relationship creator step 680 computes a signature distance between the signature from the selected frame and the signature of the first track corresponding to the appearance at the first area 615. If the signature distance is not below a predefined signature distance threshold, say 1.0, control returns to unlinked tracks decision 610. If the signature distance is below the predefined signature distance threshold, a new area relationship is created.

To create the new area relationship, a second area corresponding to the selected frame with a signature distance below the predefined signature distance threshold is determined. In one arrangement, the second area that is most similar to the first area is chosen. The new area relationship is then formed between the second area and the first area 615. The new area relationship also stores transit time and relationship strength information. In one arrangement, transit time information includes the mean and standard deviation of the transit time. The mean transit time is initialised to the time difference between the first track passing through the first area 615 and the selected frame corresponding to the second area. The standard deviation of the transit time is initialised to zero. In one arrangement, the relationship strength is a scalar and is initialised to the appearance similarity between the signature from the selected frame and the signature of the first track. The new area relationship is then stored in an array of area relationships and control returns to further potential area relationships decision 630 to select a different frame.

CONCLUSION

In the last-seen signature method, known in the art, corresponding tracks are determined based on the last-seen signature of an object. However, the last-seen signature method cannot compensate for differences in pose, which may occur, for example, when a profile view of a person is viewed as the person leaves the field of view of a first camera and a frontal view is viewed as that person enters the field of view of camera 2, as illustrated in FIG. 7. Comparing signatures corresponding to different poses prevents accurate determination of pairs of tracks corresponding to the same real-world object.

The location-based signature selection method of the present disclosure provides an advantage in this situation by comparing signatures taken from locations that have previously been shown to correspond to the same pose. This increases the robustness of determining which tracks correspond to the same real-world object.

The exemplar method, known in the art, associates a predetermined set of multiple signature exemplars with each track. Exemplars may be determined by performing clustering of previously-seen signatures of an object. For example, one exemplar may represent frontal views of a person, another exemplar may represent profile views of a person and yet another exemplar may represent the rear view of a person. A disadvantage of the exemplar method is that the correct choice of the number of exemplars is critical to accurately determining a representative set of appearances.

The location-based signature selection method of the present disclosure provides an advantage over the exemplar method by specifying which signature, or signature mode, equivalent to an exemplar, is the most likely to produce a correct match. This reduces the possibility that a correct match may be declared due to objects with appearances coincidentally derived from the same set of exemplars.

To improve the robustness of matching and therefore avoid linking of tracks with coincidentally similar appearances, the exemplar method can be used in conjunction with a spatio-temporal constraint. Therefore, two lookups must be performed: a first lookup determines the correct spatio-temporal relationship and a second lookup determines the correct exemplar. The location-based signature selection method of the present disclosure incorporates a spatio-temporal constraint through the use of area relationships. Since the area relationship is formed due to areas of known similarity in appearance, the location-based signature selection method requires only a single lookup to determine the area relationship. Therefore, once the area relationship is formed, the visual similarity can be retrieved with no extra computational cost.

INDUSTRIAL APPLICABILITY

The arrangements described are applicable to the computer and data processing industries and particularly for the imaging and security industries.

The foregoing describes only some embodiments of the present invention, and modifications and/or changes can be made thereto without departing from the scope and spirit of the invention, the embodiments being illustrative and not restrictive.

I claim:

1. A method of linking tracks of objects in different fields of view, comprising:
   detecting a first object in a first field of view and a second object in a second field of view;
   generating a first track and a second track by tracking the first object in the first field of view and the second object in the second field of view, respectively;
   accumulating, during the tracking, a plurality of first signatures representing respective appearances of the first object corresponding to different views of the first object in association with the first track and a plurality of second signatures representing respective appearances of the second object corresponding to different views of the second object in association with the second track;
   determining a first area in the first field of view, based on a portion of the first object in a frame associated with the first track;
   determining a plurality of second areas corresponding to the first area in the second field of view in a plurality of frames associated with the second track, by comparing a first one of the first signatures of the first track corresponding to the first area with the plurality of second signatures of the second track;
   comparing the first one of the first signatures corresponding to the first area and a respective one of the second signatures corresponding to the second areas; and
   linking the first track and the second track, if the first one of the first signatures matches with any of the second signatures corresponding to the second areas as a result of the comparison.

2. The method according to claim 1, wherein each of the first and the second signatures includes a predetermined number of signature modes.

3. The method according to claim 1, further comprising:
   passing a signature between the first track associated with the first field of view and the second track associated with the second field of view.

4. The method according to claim 3, where an order of passing the signature is prioritized based on at least one of a position of said first area in the first field of view, a position of said second area in the second field of view, and a number of previous matches relating to each signature mode.

5. The method according to claim 1, wherein said comparing includes:
   determining a time of transit between the second area in the second field of view and the first area in the first field of view, and
   using the time of transit in said comparison.

6. The method according to claim 1, wherein each of said first signature and said second signature has at least one signature mode, wherein each signature mode represents one view of an object.

7. The method according to claim 6, wherein each of said first signature and said second signature is associated with a predetermined maximum number of signature modes.

8. The method according to claim 1, wherein said determining of said second areas is based on at least one characteristic of a second object.

9. The method according to claim 8, wherein each of said at least one characteristic is one of a spatial, temporal, and appearance characteristic associated with said first object.

10. The method according to claim 1, further comprising:
    determining whether there are any area relationships between the first area and the area in the second field of view; and
    creating a new area relationship between the first area and the area in the second field of view if there are no area relationships therebetween.

11. The method according to claim 1, wherein the accumulating the plurality of first signatures includes:
    comparing a current appearance of the first object with each of existing first signatures; and
    adding the current appearance to the first signatures as a new signature, if a difference between the current appearance and each of the existing first signatures is larger than a threshold.

12. The method according to claim 11, wherein the accumulating the plurality of first signatures further includes:
    updating a specific one of the first signatures based on the current appearance, if a difference between the current appearance and the specific one of the first signatures is not larger than the threshold.

13. The method according to claim 1, further comprising:
    transferring one of the first signatures, which is not included in the second signatures, to the second signatures if the first track and the second track have been linked.

14. An apparatus for linking tracks of objects in different fields of view, said apparatus comprising:
    a storage device for storing a computer program; and
    a processor for executing the program, said program comprising code for performing the steps of:
    detecting a first object in a first field of view and a second object in a second field of view;
    generating a first track and a second track by tracking the first object in the first field of view and the second object in the second field of view, respectively;
    accumulating, during the tracking, a plurality of first signatures representing respective appearances of the first object corresponding to different views of the first object in association with the first track and a plurality of second signatures representing respective appearances of the second object corresponding to different views of the second object in association with the second track;
    determining a first area in the first field of view, based on a portion of the first object in a frame associated with the first track;
    determining a second plurality of second areas corresponding to the first area in the second field of view in a plurality of frames associated with the second track, by comparing a first one of the first signatures of the first track corresponding to the first area with the plurality of second signatures of the second track; and comparing the first one of the first signatures to the first area and a respective one of the second signatures corresponding to the second areas;

linking the first track and the second track, if the first one of the first signatures matches with any one of the second signatures corresponding to the second areas as a result of the comparison.

15. A non-transitory computer readable storage medium having recorded thereon a computer program for directing a computer to execute a method of linking tracks of objects in different fields of view, said computer program comprising code for performing the steps of:

detecting a first object in a first field of view and a second object in a second field of view;

generating a first track and a second track by tracking the first object in the first field of view and the second object in the second field of view, respectively;

accumulating, during the tracking, a plurality of first signatures representing respective appearances of the first object corresponding to different views of the first object in association with the first track and a plurality of second signatures representing respective appearances of the second object corresponding to different views of the second object in association with the second track;

determining a first area in the first field of view, based on a portion of the first object in a frame associated with the first track;

determining a plurality of second areas corresponding to the first area in the second field of view in a plurality of frames associated with the second track, by comparing a first one of the first signatures of the first track corresponding to the first area with the plurality of second signatures of the second track;

comparing the first one of the first signatures to the first area and a respective one of the second signatures corresponding to the second areas; and linking the first track and the second track, where the first one of the first signatures matches with any one of the second signatures corresponding to the second areas as a result of the comparing.

* * * * *